V. Fogerty,
Water Pipe.
No. 113,645.   Patented Apr. 11, 1871.
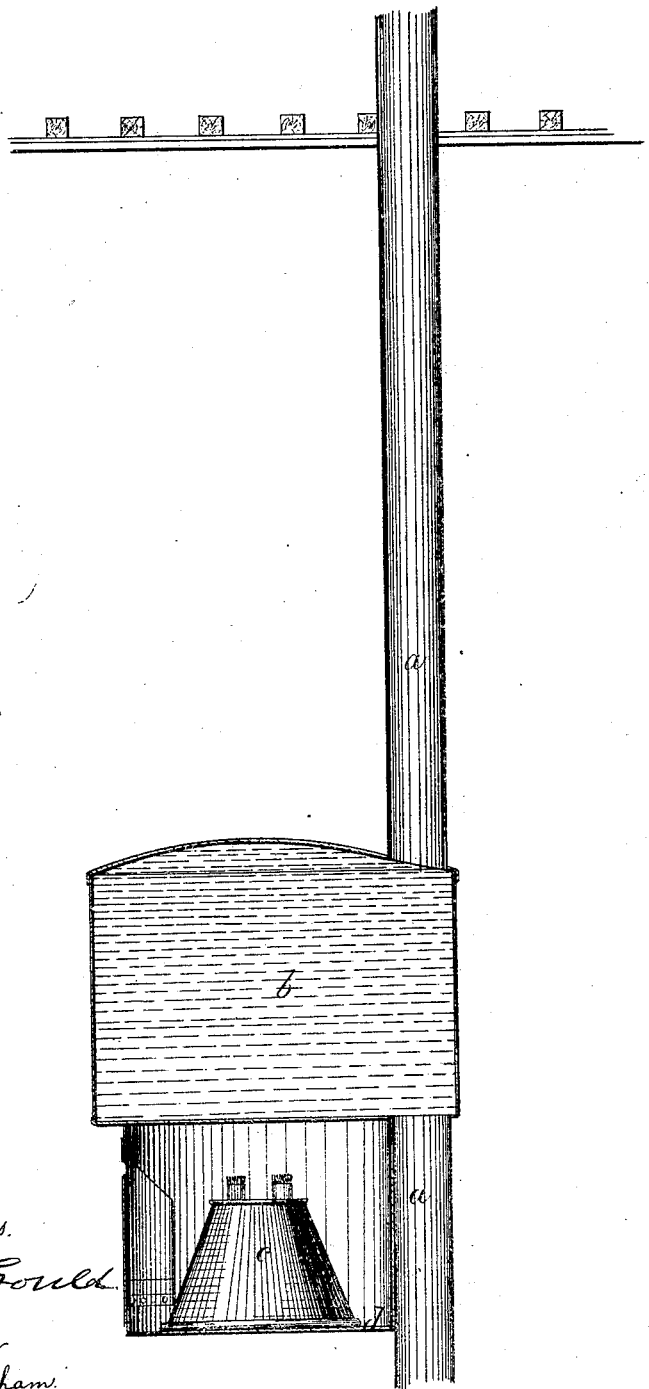
Valentine Fogerty
by his Attys.
Crosby & Gould
Witnesses.
J. B. Kidder.
M. W. Frothingham.

United States Patent Office.

VALENTINE FOGERTY, OF BOSTON, MASSACHUSETTS.

Letters Patent No. 113,645, dated April 11, 1871.

---

IMPROVEMENT IN NON-FREEZING WATER-PIPES.

---

The Schedule referred to in these Letters Patent and making part of the same.

*To all whom it may concern:*

Be it known that I, VALENTINE FOGERTY, of Boston, in the county of Suffolk and State of Massachusetts, have invented an Improvement in Preventing Water-Pipes from Freezing; and I do hereby declare that the following, taken in connection with the drawing which accompanies and forms part of this specification, is a description of my invention sufficient to enable those skilled in the art to practice it.

In cities and towns where the temperature in winter subjects water in houses to liability to freeze, and where water is supplied from elevated water-works or from tanks in the upper parts of the houses, much trouble and series damage and accidents are constantly occurring from the freezing of water in the water-pipes, and the bursting of pipes and explosion of water-backs, resulting directly and indirectly from such freezing.

To remedy this it is quite customary to leave the water-cocks running so as to effect such a circulation as shall make congelation of the water impossible.

This practice, however, is reprehensible when the supply of water is not ample, and in many cities ordinances and regulations have to be enacted and strictly enforced to arrest waste of water by leaving water-cocks open to prevent freezing. For these and other reasons I have attempted to devise some simple means by which a circulation can be effected through charged water-pipes to prevent their freezing, the result of which is the invention herein described.

At any suitable point in the lower part of the supply or main pipe I make a lateral chamber extending from the pipe, or into and from which the pipe leads, under which chamber I locate a lamp or gas-burner in such manner that the flame shall impinge against the bottom of the lateral pipe or chamber and heat the water therein, a small flame or amount of heat so applied being sufficient to create an active circulation throughout the main pipe and its branches of most water-supplied houses.

My invention consists in combining with the tank or pressure-supplied water-pipes of a house a water-leg or lateral chamber extending from the pipe, and so arranged or located that it can have a lamp or burner beneath it to heat the water, and thereby produce a circulation throughout the pipes.

The drawing shows a water-pipe with my invention embodied therewith.

*a* denotes the main pipe, and

*b* the lateral water-leg or chamber extending from the pipe, or so constructed and arranged that the pipe opens into its bottom and from its top, forming in effect a part of the pipe, and being, of course, filled with water at all times, the same as is the pipe *a*.

*c* denotes a lamp placed directly under the chamber *a*, or so that its flame will heat the bottom of the chamber *b*, the lamp being supported on a suitable shelf or stand, *d*.

Instead of the lamp, a gas-burner may be so located that it will stand under or may be swung under the chamber. In either case the heat of the flame will heat the water in the chamber, and the heated water will rise and effect a circulation throughout the pipe or pipes above, and will be an effective agent in producing such movement in the water as to render it impossible for it to freeze. With a lamp it will, of course, be advisable to use an oil giving off but little smoke, and in using gas it is best to employ a gas-heater burner that mixes oxygen with the gas and insures a blue heat-giving and non-smoking flame.

I claim—

In combination with the water supply-pipe *a*, a lateral water-leg or chamber, *b*, to be heated by the flame of a lamp or gas-burner, substantially as described.

VALENTINE FOGERTY.

Witnesses:
 FRANCIS GOULD,
 S. B. KIDDER.